United States Patent [19]
Muzic

[11] Patent Number: 5,568,018

[45] Date of Patent: Oct. 22, 1996

[54] FLUORESCENT LIGHT BALLAST CIRCUIT

[75] Inventor: Fred A. Muzic, 16411 Underhill La., Huntington Beach, Calif. 92647

[73] Assignee: Fred A. Muzic, Huntington Beach, Calif.

[21] Appl. No.: 407,393

[22] Filed: Mar. 17, 1995

Related U.S. Application Data

[63] Continuation of Ser. No. 115,476, Sep. 1, 1993, abandoned.

[51] Int. Cl.$^6$ .................................................. H05B 41/16
[52] U.S. Cl. ................ 315/276; 315/101; 315/200 R; 315/352; 315/272; 315/203; 315/206; 315/ DIG. 5
[58] Field of Search ..................... 315/101, 105, 315/219, 276, DIG. 5, 200 R, 201, 202, 203, 206, 272, 352

[56] References Cited

U.S. PATENT DOCUMENTS

| | | | |
|---|---|---|---|
| 3,997,814 | 12/1976 | Toho | 315/200 R |
| 4,004,184 | 1/1977 | Oh | 315/101 |
| 4,122,375 | 10/1978 | Stüdli | 315/101 |
| 4,237,403 | 12/1980 | Davis | 315/98 |
| 4,410,836 | 10/1983 | Roche | 315/101 |
| 4,906,899 | 3/1990 | Hope et al. | 315/101 |
| 5,206,563 | 4/1993 | Castelli | 315/200 R |

FOREIGN PATENT DOCUMENTS

| | | | |
|---|---|---|---|
| 2500580 | 7/1976 | Germany | 315/101 |
| 2755614 | 6/1979 | Germany | 315/101 |

*Primary Examiner*—Robert Pascal
*Assistant Examiner*—Darius Gambino
*Attorney, Agent, or Firm*—Knobbe, Martens, Olson & Bear

[57] ABSTRACT

An improved fluorescent light ballast circuit extends the on/off life of a florescent lamp within a lighting circuit having a pair of series connected fluorescent lamps. The ballast circuit includes a DC pulse generation circuit, filtering and voltage regulation circuitry, a step-up voltage transformer, and a current altering circuit which alters the current within selected filaments within the lamps. The current altering circuit includes a diode and a coil winding which connect across a filament within one of the fluorescent lamps. The net effect of the current altering circuit is to increase the voltage supplied across the lamp connected to the current altering circuit so that the voltage levels across both lamps are balanced.

7 Claims, 5 Drawing Sheets

FLUORESCENT LIGHT BALLAST CIRCUIT

This application is a continuation of application Ser. No. 08/115,476, filed Sep. 1, 1993, now abandoned.

FIELD OF THE INVENTION

The present invention relates to ballast circuits for starting fluorescent light bulbs, and more particularly, to ballast circuits which extend the on/off life of fluorescent light bulbs.

BACKGROUND OF THE INVENTION

Fluorescent lighting has long been popular among consumers due to the increased efficiency of fluorescent lights over typical incandescent bulbs, and also due to the soft lighting effect provided by fluorescent bulbs.

A typical fluorescent bulb includes two tungsten filaments separated by a tube filled with ionizable gas, such as mercury vapor, with an argon or argon-neon starting gas, as well understood in the art. The filaments are usually coated with a special coating that is provided to supply additional electrons for ionization of the gas within the tube. When a very high voltage is supplied across the tube (i.e., from one filament to the other), electrons build up at the negative voltage filament until the gas within the tube is sufficiently ionized. Once the gas within the tube is ionized, the electrons flow through the gas to complete the circuit and produce electrical current flow through the tube, thereby illuminating the lamp.

Typically, the voltage levels across the bulb must be very high (e.g., several hundred volts) in order to ionize the gas sufficiently to produce current flow. Thus, a starting circuit having, for example, a step-up voltage transformer, is generally used as a ballast to provide the high voltage levels necessary for illuminating the lamps. Nevertheless, it is still advantageous to reduce the required starting voltage as much as possible. One method which is conventionally used to reduce the voltage necessary to produce current flow across the tube involves heating the filaments with a relatively low voltage. By heating the filaments, a greater supply of electrons is produced by the coated tungsten filaments so that it is possible to ionize the gas with a lower voltage across the tube.

The higher efficiency of fluorescent bulbs makes them ideal for applications where limited power is available, such as in the electrical system of recreational vehicles which often run off of a 12-volt battery. For example, fluorescent lamps are often used in recreational vehicles and the like. Many recreational vehicles have fluorescent lamps that turn on and off when the door opens and closes. If the owner uses the vehicle frequently enough, these lamps may be turned on and off up to 10,000 times a year. Unfortunately, currently available fluorescent lamps usually have an on/off life of 4,000–6,000 illuminations so that a recreational vehicle owner may have to replace these lamps as often as two or even three times a year.

The primary cause of failure for fluorescent light bulbs which are turned on and off frequently is burn-out of the filaments. The filaments generally burn out because the special coating on the filaments, which provides the main supply of electrons, is radiated off of the filaments and deposited onto the interior of the tube near the filaments. When the coating on the filaments becomes too thin, not enough electrons are provided to initiate current flow through the tube and the lamp will not illuminate. Typically, when the coating from one of the filaments is being radiated, a blue glow is observable at the end of the tube near the filament.

Radiation of the filament coating may be produced by a number of factors. Most notably, when a high voltage level is applied across the tube or the filament for an extended time period, a substantial quantity of the coating on the filament is likely to be radiated. Since the highest voltage levels across the tube and the filaments within a fluorescent light ballast circuit usually occur just prior to ignition (i.e., illumination) of the fluorescent lamp, it is preferable to minimize the start-up period as much as possible to prevent burn-out of the fluorescent lamps.

SUMMARY OF THE INVENTION

The present invention comprises a lighting apparatus that extends the on/off life of a pair of series connected fluorescent lamps. A first fluorescent tube has a first filament at one end and a second filament at another end. Each of the filaments in the first fluorescent tube is connected across first and second contacts. A second fluorescent tube has a first filament at one end and a second filament at another end. Each of the filaments in the second fluorescent tube is connected across first and second contacts. The tubes are powered by a step-up voltage transformer having a low voltage input side and a high voltage output side. A DC pulse generation circuit comprising a single transistor periodically varies the voltage at the low voltage input side of the transformer to induce a periodically varying voltage at the high voltage output side of the transformer. The first contact of the first filament of the first tube, and the second contact of the first filament of the second tube are both connected to the DC pulse generation circuit. The second contact of the first filament of the first tube is connected to the first contact of the first filament of the second tube to provide a pair of connected filaments. The contacts of the second filaments of the first and second tubes are each connected to the high voltage output side of the step-up voltage transformer. The DC pulse generating circuit produces a current flow through the pair of connected filaments which changes direction in accordance with the periodically varying voltage. A current altering circuit causes the ratio of the current in one of the connected filaments to the current in the other of the connected filaments to change between first and second values each time the current flow through the connected filaments changes direction.

In the preferred embodiment of the invention, the first and second values are such that the peak to peak voltage across the filaments of the first tube is substantially equalized with respect to the peak to peak voltage across the second tube. The ratio is one when the current flow is from the first filament in the first tube to the first filament in the second tube, and is other than one when the current is in the opposite direction. Specifically, the current flow through the first filament of the first tube is less than the current flow through the first filament of the second tube when the current flow is from the first filament of the second tube to the first filament of the first tube. The current altering circuit is connected across the first filament of the second tube and comprises a diode connected to a winding at the low voltage input side of the transformer.

DETAILED DESCRIPTION OF THE INVENTION

Figure 1:
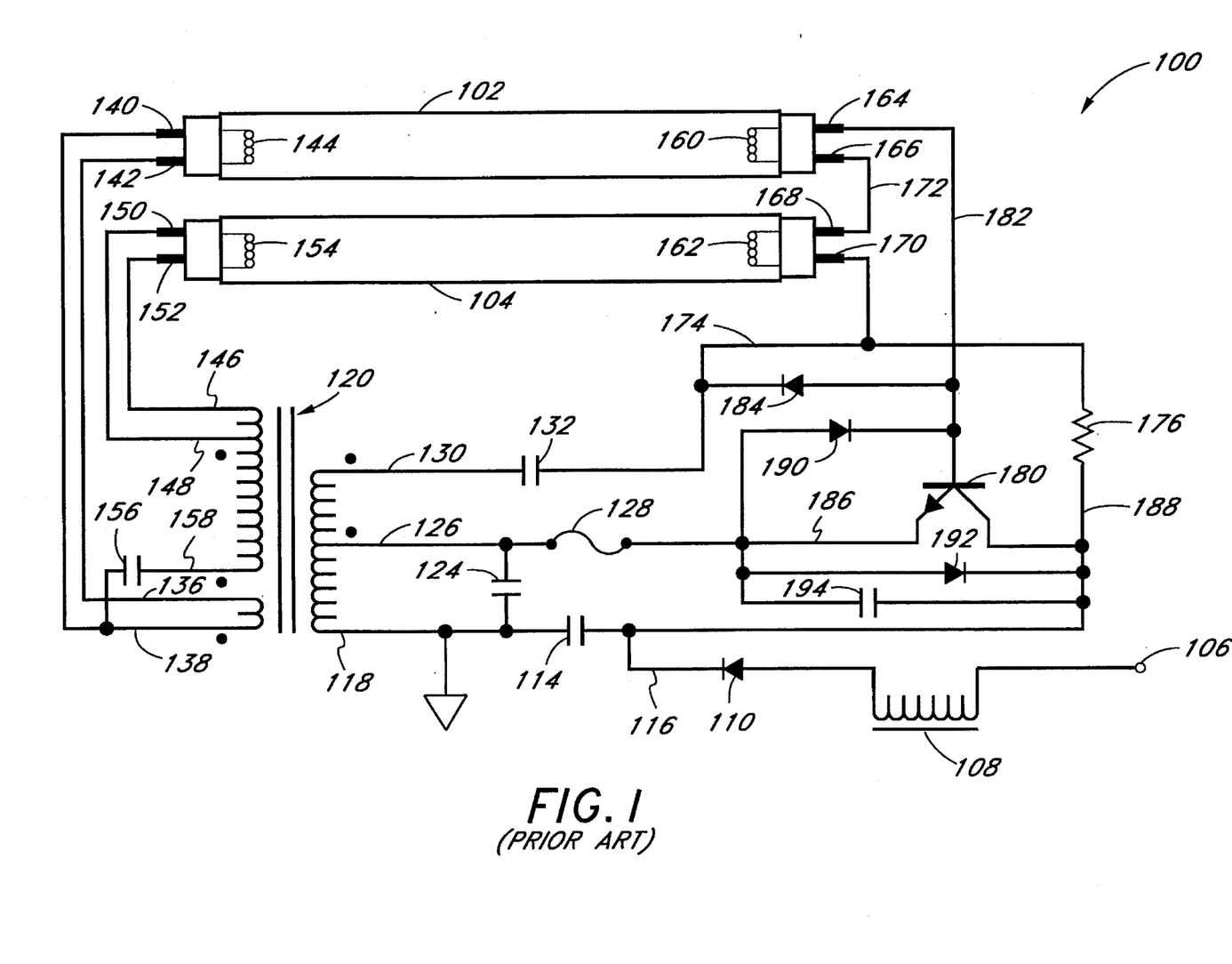
FIG. 1 is a schematic diagram of a prior art fluorescent light ballast circuit.

FIG. 1 is a schematic diagram showing a fluorescent light ballast circuit 100 which is well-known in the art and available from Sunbeam Trailer Products, Inc., 16661 Gemini Lane, Huntington Beach, Calif. 92647. The ballast circuit 100 is sold as part of a lighting fixture under Model No. FL-930NCC. The circuit 100 is used as a starter to illuminate a pair of fluorescent lamps comprising tubes 102, 104. A light switch (not shown) connects to an input terminal 106 and applies a nominal 12-to-24-volt DC input at the terminal 106 when the light switch is in the closed position. Although normal operation of the circuit requires a 12-volt input, the circuit is designed to tolerate up to 24 volts input at the terminal 106, in the event of an accidental hook up or voltage surge. The terminal 106 connects to an inductor 108 having an exemplary value of 11.6 mH. The inductor 108 connects to a diode 110 via a line 112. The diode 110 may, for example, comprise a 3-amp Schottky diode, Part No. 1N5821. The diode 110 connects to a capacitor 114 via a line 116. In one embodiment, the capacitor 114 is an aluminum electrolytic capacitor having a value of 220 micro farads and a voltage rating of 35 volts. The capacitor 114 in turn connects to ground.

A terminal 118 of a transformer 120 also connects to ground. The transformer 120 advantageously comprises a ferrite E-core transformer, Model No. 9477016002, having multiple taps. In one actual embodiment, the transformer 120 is gapped (that is, a space is formed between the center legs of the facing E-cores, as is well understood in the art) at about 4.5 mills. A capacitor 124 connects in parallel with a portion of the input coil of the transformer 120 between a tap 126 and ground. In one embodiment, the capacitor 124 comprises a monolithic ceramic capacitor having an exemplary value of 0.068 micro farads and a voltage rating of 50 volts. In one advantageous embodiment, there are 20 coil windings between the tap 126 and the tap 118 at ground. A thermal auto-reset circuit breaker 128 further connects to the tap 126 on one end. A tap 130 from the input coil winding of the transformer 120 also connects to a capacitor 132, which in one embodiment may comprise a metallized polyester capacitor having a value of 0.47 micro farads and a 100-volt maximum rating. In one embodiment, there are 13 coil windings between the tap 130 and the tap 126.

On the output coil winding portion of the transformer 120, taps 136 and 138 connect to input terminals 140 and 142 respectively of the lamp 102 so that a filament 144 within the lamp 102 is connected across the portion of the output coil winding between the taps 136 and 138. In one embodiment, there are 10 coil windings between the taps 136 and 138. Similarly, taps 146, 148 on the output coil winding of the transformer 120 connect to input terminals 150, 152, respectively, of the lamp 104 so that a filament 154 is connected across the portion of the output coil winding between the taps 146, 148. In one embodiment, there are 8 coil windings between the taps 146, 148. A capacitor 156 which may, for example, comprise a polypropylene film/foil capacitor having a value of 0.0068 micro farads and a 600-volt maximum voltage rating connects between a tap 158 and the tap 138. The tap 158 connects to the output coil winding of the transformer 120 so that there are 220 coil windings between the tap 158 and the tap 148 in one embodiment.

When the lamps 102, 104 are sufficiently excited by the appropriate voltages, current flows from the filaments 144, 154 to filaments 160, 162, respectively. The filament 160 connects to output terminals 164, 166 while the filament 162 connects to output terminals 168, 170. The output terminals 166 and 168 connect via a line 172. The output terminal 170 connects to the capacitor 132 via a line 174. The output terminal 170 further connects to one end of a resistor 176 via the line 174. In one embodiment, the resistor 176 is a metal oxide resistor having a 2 kilo-ohm resistance and a one watt power rating. The output terminal 164 connects to the base of a transistor 180 via a line 182. The transistor 180, as shown in FIG. 1, is connected in an emitter follower configuration. In one embodiment, the transistor 180 comprises a 10-amp, 60-volt NPN transistor, part No. MJF44H11.

It will be appreciated that a single transistor circuit configuration offers a number of significant advantages over multiple transistor circuits. Most notably, single transistor circuits are significantly less expensive to manufacture and test than typical multiple transistor circuits. Also, due to their simplicity of design, single transistor circuits are typically easier to repair and can often be more reliable than multiple transistor circuits.

A diode 184, which may comprise a 1.5 amp silicon rectifier diode Part No. J05, connects between the line 182 at the base of the transistor 180 and the line 174 at the capacitor 132. The emitter of the transistor 180 connects to the circuit breaker 128 via a line 186, while the collector of the transistor 180 connects to one end of the resistor 176 via a line 188. A diode 190 connects between the line 186 at the emitter of the transistor 180 and the line 182 at the base of the transistor 180. In one embodiment, the diode 190 comprises a 1.5 amp silicon rectifier Part No. J05. A diode 192 and a capacitor 194 connect in parallel between the line 186 at the emitter of the transistor 180 and the line 188 at the collector of the transistor 180. In one embodiment, the capacitor 194 is a monolithic ceramic capacitor having a value of 0.068 micro farads and a maximum voltage rating of 50 volts while the diode 192 comprises a 1.5 amp silicon rectifier diode Part No. J05.

In operation, the conventional ballast circuit 100 acts as a starter circuit which provides sufficient voltage levels to energize and illuminate the lamps 102, 104. During normal operation, a 12-volt DC voltage is applied to the input terminal 106. Of course, it will be appreciated by one skilled in the art that the voltage applied at the input terminal 106 could also be a rectified 60 Hz sine wave having a peak voltage of 22 volts so that the voltage average is approximately 12 volts. When a voltage is applied to the input terminal 106, current flows through the inductor 108. The inductor 108 is provided as a filtering inductor which prevents high-frequency pulses from feeding back out of the circuit 100 and entering the electrical system of the recreational vehicle. Thus, the inductor 108 acts to isolate the fluorescent light ballast circuit 100 from the rest of the electrical system of the recreational vehicle. Current continues to flow from the inductor 108 through the blocking diode 110. The blocking diode 110 is provided to prevent transistor burn-out in the event that a negative 12-volt input rather than a positive 12-volt input is applied to the input terminal 106. A negative 12-volt voltage may be applied to the input terminal 106 if, for example, the battery for the recreational vehicle is hooked up backwards. Thus, the blocking diode 110 prevents current flow in the event that a negative voltage is applied to the terminal 106 so that the remainder of the ballast circuit 100 does not see the negative voltage.

Assuming that a positive voltage is applied to the input terminal 106, the capacitor 114 is provided to smooth out the input voltage applied at the terminal 106. For example, if the input voltage is a rectified 60 Hz sine wave, then the capacitor 114 prevents the rectified wave from dropping all the way to zero volts. With the proper value, the capacitor 114 advantageously allows the rectified wave to drop as low as six volts. This substantially increases the efficiency of the ballast circuit 100 and increases the longevity of the transistor 180. The other end of the capacitor 114 connects to the ground. Therefore, the voltage present across the capacitor 114 is applied both to the collector of the transistor 180 and to one end of the resistor 176.

Since, as of yet, there is no current supplied to the base of the transistor 180, the transistor 180 acts as an open circuit so that substantially all 12 volts are dropped from the collector to the emitter of the transistor 180. However, the voltage applied at the resistor 176 causes current to flow along the line 174, through the filament 162, the filament 160, and into the base portion of the transistor 180 via the line 182. Once an adequate current has been supplied to the base of the transistor 180, current flows from the collector to the emitter of the transistor 180 so that only a small voltage of approximately 0.6 volts is dropped from the collector to the emitter of the transistor 180. Current subsequently flows from the emitter of the transistor 180 through the circuit breaker 128 and into the input coil of the transformer 120 via the line 126.

Current flow within the transformer 120 causes the capacitor 132 to charge, which in turn draws current away from the base of the transistor 180 via the line 174 and through the diode 184. As current is drawn away from the base of the transistor 180, the transistor 180 turns off so that the path from the collector to the emitter of the transistor once again becomes an open circuit. Thus, current flow from the collector to the emitter ceases. Because the emitter no longer emits current, no further current is supplied to the input coils of the transformer 120 so that the capacitor 132 does not continue charging. Instead, a high voltage is once again applied across the resistor 176 and the filaments 162, 160 to supply an adequate base current to the transistor 180. Furthermore, the capacitor 132 discharges via the path 174 to increase the current flow into the base of the transistor 180 so that the transistor 180 turns on.

The cycle described above repeats so that a pulsing DC current is generated by the circuit comprising the transformer 180, the resistor 176, the filaments 162, 160, the capacitor 132, and the input coil of the transformer 120. In one embodiment, the frequency of the pulsing DC current generated by the circuit is approximately 30 KHz. It should further be noted that the value of the capacitor 132, together with the length of the lamps 102, 104 may be varied to effect the duty cycle of the pulsing DC waveform, and in the embodiment described herein, a 0.47 microfarad value for the capacitor 132 provides approximately a 50% duty cycle when the lamps 102, 104 are each 18 inches long.

The diodes 190 and 192 are primarily provided as regulation diodes that prevent burn-out of the transistor 180. Specifically, the diode 190 keeps the voltage from the emitter to the base of the transistor 180 less than or equal to 0.6 volts. Similarly, the diode 192 keeps the voltage from the emitter to the collector of the transistor 180 less than or equal to 0.6 volts, as is well-known in the art. Advantageously, the diode 190 also includes some significant internal capacitance which may be used to prevent voltage spikes from entering the base of the transistor 180, thereby preventing failure of the transistor 180. The diode 184 aids the isolation process by providing an additional path by which current can be drawn from the base of the transistor 180 by the capacitor 132.

The capacitors 194, 124 act primarily as filtering capacitors, which are used to clip voltage spikes generated within the ballast circuit. This ensures that the electrical system of the recreational vehicle is not affected substantially by feedback pulses generated by the ballast circuit.

As the ballast circuit continues in normal operation, a periodically varying voltage, in the form of an approximately 30 KHz pulsing DC voltage, is applied at the input coils of the transformer 120. This, in turn, causes a 30 KHz pulsing DC voltage to be induced within the output coils of the transformer 120. The voltages output across each of the taps 146, 148, 158, 136, 138 are proportional to the number of windings between the respective taps. For example, the voltage present between the taps 148, 158 is approximately 22 times higher than the voltage present between the taps 136, 138. The taps 146, 148 supply a 30 KHz pulsed DC voltage to the filament 154 via the input terminals 150, 152. Likewise, the taps 136, 138 supply a 30 KHz pulsed DC voltage to the filament 144 via the input terminals 140, 142. The voltages supplied between the taps 146, 148 and the taps 136, 138 are normally fairly small, ranging from 4 to 5 volts when the lamps 102, 104 are turned on to 20 to 25 volts just before ignition of the lamps 102, 104. The voltages provided across the taps 146, 148 and 136, 138 serve to heat the filaments 154, 144, respectively, as is well-known in the art.

The voltage across the taps 148, 158 serves as the high-input voltage used to light the lamps 102, 104. As can be seen from FIG. 1, a complete circuit is provided from the tap 158 through the capacitor 156, the lamp 102, the line 172, the lamp 104, and the tap 148 so that the lamps 102, 104 are essentially in series within the circuit having a voltage supplied across the taps 148, 158. When a sufficient voltage level is applied across each of the lamps 102, 104, the gas within the lamps 102, 104 ionizes so that current is able to flow from the filament 144 to the filament 160, and likewise from the filament 162 to the filament 154, thereby completing the circuit. Once sufficient ionization has occurred within each of the lamps 102, 104, the lamps ignite.

It should be noted here that the capacitor 156 introduces a slight phase shift which primarily serves to synchronize the pulsed DC voltage at the output of the transformer 120. Furthermore, the value of the capacitor 156 may be varied to slightly affect the duty cycle of the DC pulsed voltage generated within the ballast circuit 100. Also, the gap width formed in the core of the transformer 120 may be varied to affect the frequency of the voltage waveform generated within the ballast circuit 100.

Thus, the fluorescent light ballast circuit 100 causes the lamps 102, 104 to ignite upon the application of a 12-volt input at the terminal 106. Although the circuit 100 is sufficient for operation with fluorescent lamps in many applications, certain limitations exist within the circuit 100 since such a circuit may only provide 4,000–6,000 on/off cycles before one or both of the lamps 102, 104 fail. It has been found, in fact, that the lamp 104 regularly fails far sooner than the lamp 102.

Figure 2:
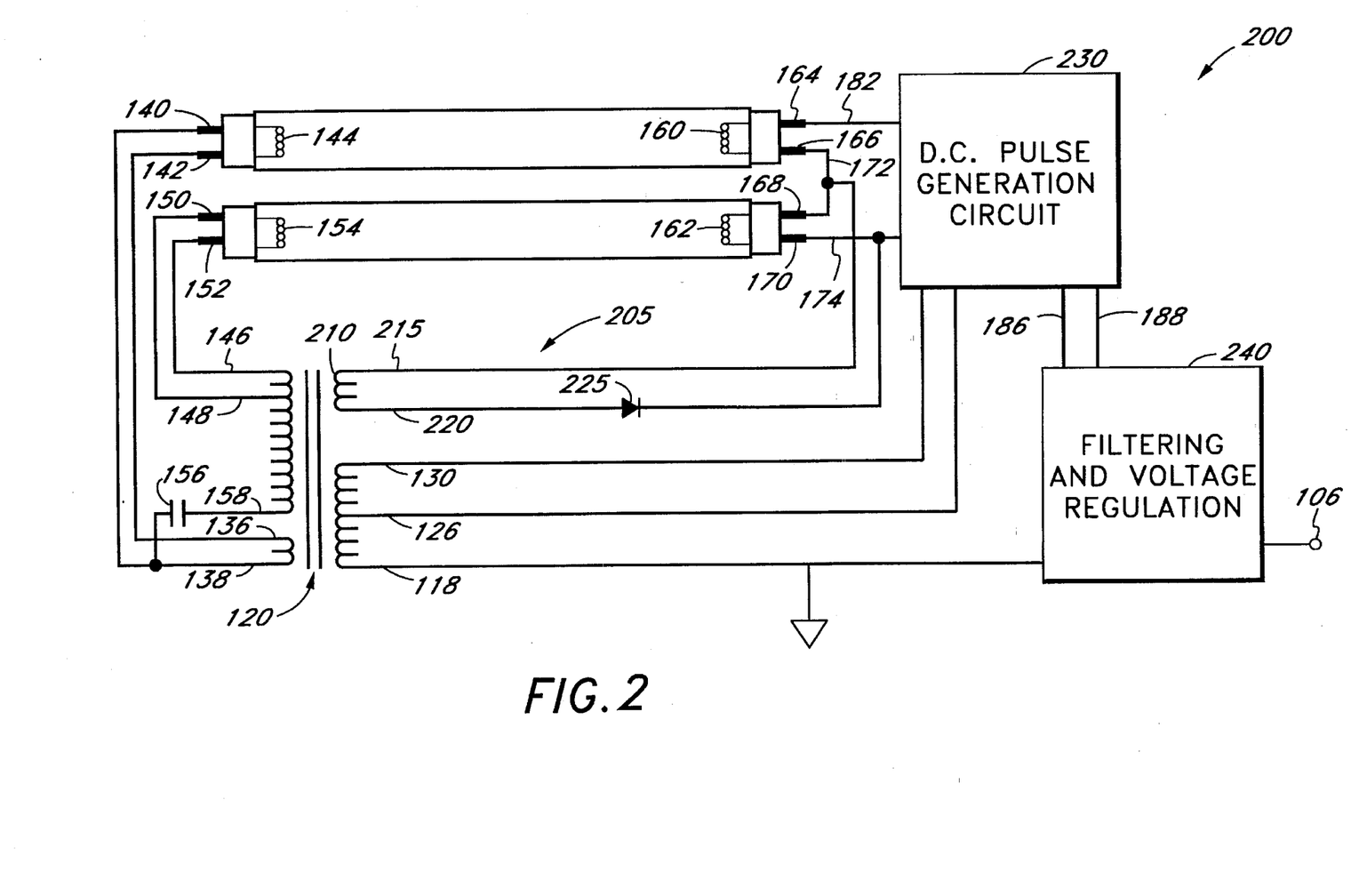
FIG. 2 is a schematic block diagram of an improved fluorescent light ballast circuit which is constructed in accordance with the teachings of the present invention.

An improved fluorescent light ballast circuit 200 constructed in accordance with the teachings of the present invention extends the life of both the lamps 102, 104 up to 25,000 on/off cycles. FIG. 2 is a schematic block diagram of the improved fluorescent light ballast circuit 200. Although the improved circuit 200 is shown in FIG. 2 in block diagram form, the circuit 200 is substantially identical to the circuit 100 with the exception that an additional circuit loop, referred to hereinafter as a current altering circuit 205, is connected across the filament 162 at the lines 172, 174. The current altering circuit 205 comprises an additional transformer winding 210 between taps 215 and 220, and a diode 225. A block 230, generally designated as a DC pulse generation circuit, includes the transistor 180, the resistor 176, the capacitor 132, and the diodes 184, 190, and 192. A block 240, generally designated as a filtering and voltage regulation circuit, includes the capacitors 114, 124, 194, the circuit breaker 128, the diode 110, and the inductor 108.

The input terminal 106 enters the filtering and voltage regulation circuitry 240. The filtering and voltage regulation circuitry 240 connects to the DC pulse generation circuit 230 via the lines 186, 188. The filtering and voltage regulation circuitry 240 further connects to ground and to the tap 118 of the transformer 120. The DC pulse generation circuit 230 connects to the taps 126, 130 of the transformer 120, as well as to the filament terminals 164, 170 via the lines 182, 174 respectively. The output coil windings of the transformer 120 (i.e., the coil windings connected to the taps 136, 138, 146, 148, and 158) are connected exactly as described with reference to FIG. 1.

The current altering circuit 205 is connected across the filament 162 at the lines 172, 174 so that the coil winding 210 connects to the line 172 via the tap 215, while the diode 225 connects between the tap 220 and the line 174. In one actual embodiment, the coil winding 210 has 8 windings between the taps 215, 220, and the diode 225 comprises a 500 mW high speed switching diode, part number 1N4148. The diode 225 is connected so that electron current is allowed to flow from the line 172 to the line 174, but is blocked in the opposite direction. This prevents current from being drawn away from the base of the transistor within the DC pulse generation circuit 230, and also insures that current through the filament 162 is always increased and never decreased, as will be discussed in greater detail below.

Without the current altering circuit 205, the current through one of the filaments 160, 162 would be identical to the current through the other of the filaments 160, 162, since the filaments 160, 162 are in series. However, with the circuit 205 connected as shown in FIG. 2, the filament currents are not always identical. As current flows from the filament 162 to the filament 160, the additional current supplied by the coil 210 causes an increase of current through the filament 162, and a decrease of current through the filament 160. The current through the filament 160 decreases because an alternative current path through the line 172 diverts some of the current from the resistor 176. Because the current is DC pulsed, and therefore changes polarities, one would expect that an opposite effect would occur when current flows from the filament 160 to the filament 162. That is, current would increase through the filament 160 and decrease through the filament 162. However, in the circuit illustrated, the diode 225 serves to prevent current flow through the current altering circuit 205 when current is flowing from the filament 160 to the filament 162. Thus, the current altering circuit 205 acts as an open circuit and the current through each of the filaments 160, 162 is identical, just as if the circuit 205 were not present. Thus, the overall effect is to produce a net increase of current through the filament 162 and a net decrease of current through the filament 160 during alternating half cycles of current flow through the filaments.

Figure 3A:
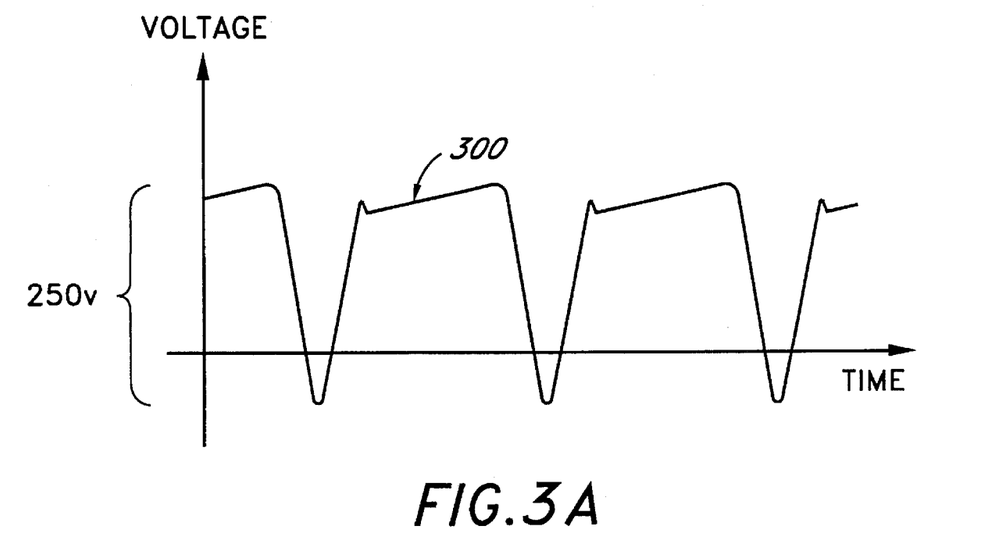
FIGS. 3A–3D depict signal waveforms taken across the terminals of the fluorescent lamps which more clearly illustrate the operation of the present invention.

FIGS. 3A–3D and FIG. 4 show the effect of the current altering circuit 205 on the voltage levels across the lamps 102 and 104. FIG. 3A depicts a voltage waveform 300 present across the terminals 168 and 152 just prior to ignition of the lamps 102, 104 in the conventional starter circuit 100 of FIG. 1 (i.e., without the current altering circuit 205). Ignition of the lamps typically occurs when between 6 and 7 volts DC are applied at the input terminal 106, and the input voltage at the terminal 106 is approximately six volts for the waveform 300. As indicated in FIG. 3A, the peak-to-peak voltage across the terminals 168, 152 is approximately 250 volts when six volts is applied to the input terminal 106.

Figure 3B:
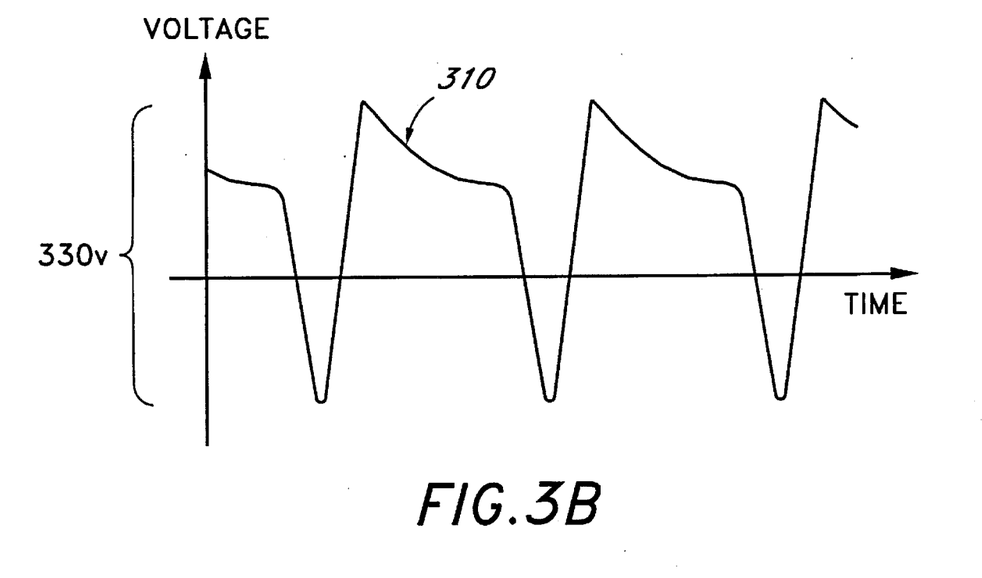

FIG. 3B depicts a voltage waveform 310 present across the terminals 140 and 166 just prior to ignition of the lamps 102, 104 in the conventional starter circuit 100 (i.e., without the current altering circuit 205) when six volts DC is applied to the input terminal 106. As indicated in FIG. 3B, the peak-to-peak voltage across the terminals 140, 166 is approximately 325 volts. Therefore, in the conventional circuit 100, the peak-to-peak voltages across the lamp 102 and the lamp 104 differ significantly. This explains why the lamp 104 typically burns-out sooner than the lamp 102. Namely, the lamp 102 has a voltage which is sufficient to light the lamp 102 immediately, while the ignition of the lamp 104 is delayed due to the lower voltage applied across the lamp 104. Although the voltage applied across the lamp 104 is somewhat lower than the voltage applied across the lamp 102 in the circuit 100, the voltage applied across the lamp 104 is still enough to cause significant radiation of the coating off of the filament 162.

Figure 3C:
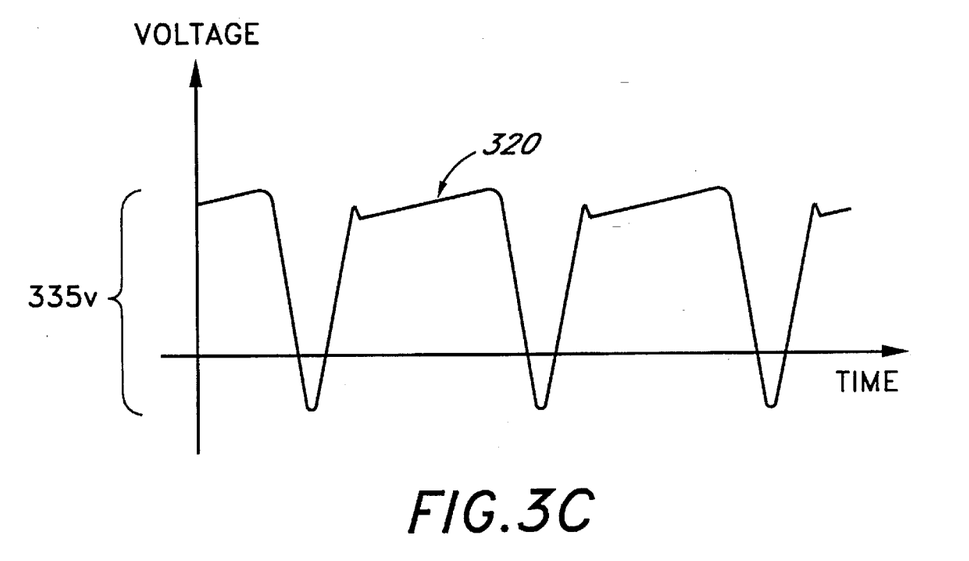
Figure 3D:
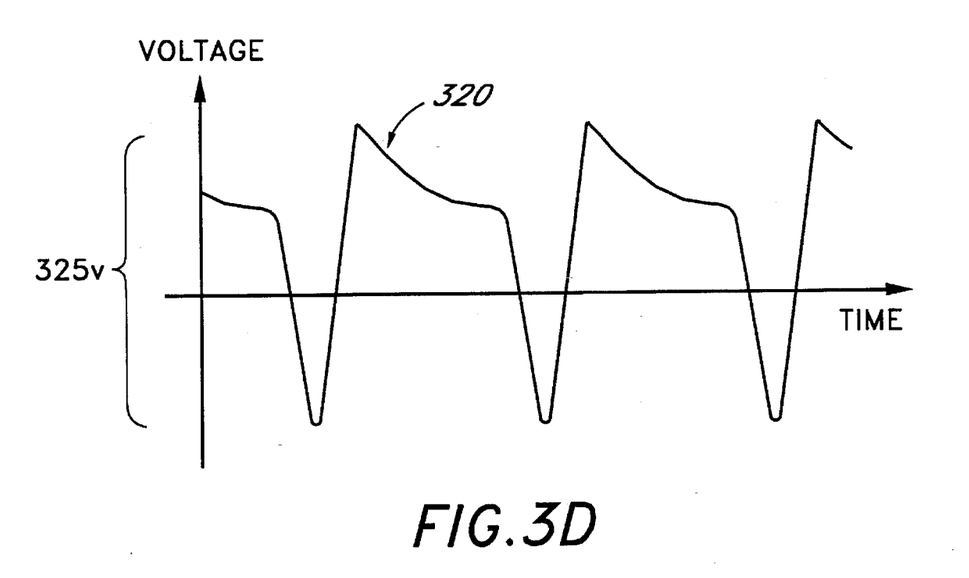
Figure 4:
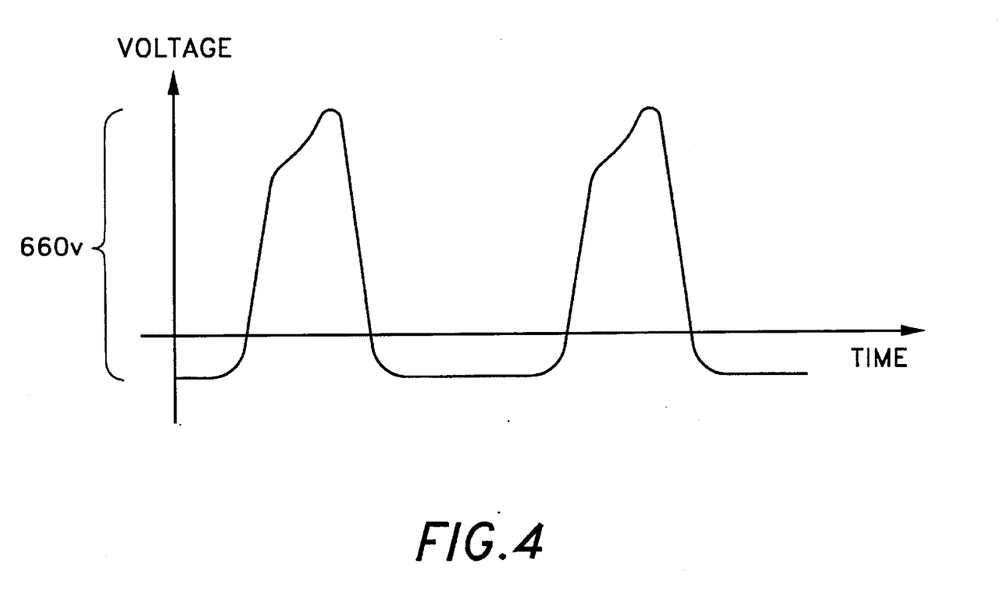
FIG. 4 depicts a voltage waveform taken across both fluorescent lamps in series just prior to ignition of the lamps.

FIGS. 3C and 3D depict voltage waveforms 320, 330 taken across the terminals 168, 152 and 140, 166, respectively, of the lamps 104, 102, respectively, in the improved ballast circuit 200. The waveforms 320, 330 depict the voltage just prior to ignition of the lamps 102, 104 when the input voltage applied to the terminal 106 is approximately six volts. In addition, FIG. 4 depicts a voltage waveform 340 taken across terminals 140, 152 just prior to ignition of the lamps 102, 104. Comparing FIG. 3A with FIG. 3C, note that in the improved ballast circuit 200, the peak-to-peak voltage of the waveform 320 is significantly greater than the peak-to-peak voltage of the waveform 300 measured across the lamp 104 in the conventional circuit 100 (i.e., approximately 335 volts as compared to 250 volts). As shown by the waveforms 320, 330, and 340 depicted in FIGS. 3C, 3D, and 4 the improved circuit 200 of the present invention increases the voltage across the lamp 104, and the overall voltage across the lamps 102, 104, so that the voltage across the lamp 104 is approximately equal to the voltage applied across the lamp 102. Thus, the lamp 104 lights substantially at the same time as the lamp 102. The immediate ignition of the lamps 102, 104 in the improved circuit 200 substantially reduces the amount of radiated filament coating, and the lamps 102, 104 can have an on/off life span of up to 25,000 illuminations. In addition, the substantial simultaneity of the ignition of the lamps 102, 104 insures a more or less even on/off life span for both lamps 102, 104. Thus, the improved fluorescent lamp starting circuit 200 of the present invention is ideal for use in low power lighting applications where frequent ignitions of the fluorescent lights is expected.

The present invention may be embodied in other specific forms and modifications, as will be contemplated by those of ordinary skill in the art, which do not depart from its spirit or essential characteristics. For example, the frequency or duty cycle of the pulsed DC waveform may be varied to suit a particular application. Also, the DC pulse generation circuit 230 may be embodied in several specific forms, and may produce an alternating waveform having various frequencies as called for by the specific application. Furthermore, the values of certain components may be altered as required by a specific use of the invention. Therefore, the foregoing description should be considered illustrative rather than restrictive. Thus, the scope of the present invention should be interpreted in light of the following claims, and any equivalents thereto.

I claim:

1. A lighting apparatus having first and second fluorescent lamps, said first fluorescent lamp having a first filament at one end and a second filament at another end, each of said filaments of said first lamp being connected across first and second contacts, and said second fluorescent lamp having a first filament at one end and a second filament at another end, each of said filaments of said second lamp being connected across first and second contacts, said apparatus comprising:

a step-up voltage transformer having a low voltage input side and a high voltage output side;

a DC pulse generation circuit comprising a transistor, for periodically varying voltage at said low voltage input side of said transformer to induce a periodically varying voltage at said high voltage output side of said transformer;

said first contact of said first filament of said first lamp and said second contact of said first filament of said second lamp both being connected to said DC pulse generation circuit, and said second contact of said first filament of said first lamp being connected to said first contact of said first filament of said second lamp to provide a pair of series connected first filaments, said contacts of said second filaments of said first and second lamps each being connected to said high voltage output side of said step-up voltage transformer, whereby said DC pulse generating circuit produces a current flow through said pair of series connected first filaments which oscillates in accordance with said periodically varying voltage;

a current altering circuit which causes the current in one of the series connected first filaments to be unequal to the current in the other of the series connected first filaments each time the current flow through said series connected first filaments oscillates; whereby the circuit equalizes the voltages across the first and second lamps immediately prior to ignition of first and second lamps.

2. The apparatus of claim 1, wherein the current through said series connected first filaments are such that the peak to peak voltage across the first lamp is substantially equalized with respect to the peak to peak voltage across the second lamp.

3. The apparatus of claim 1, wherein the current through said one of said series connected first filaments is equal to the current in said other of the series connected first filaments when the current flow is from the first filament in the first lamp to the first filament in the second lamp.

4. The apparatus of claim 3, wherein the current flow through the first filament of the first lamp is less than the current flow through the first filament of the first lamp when the current flow is from the first filament of the second lamp to the first filament of the first lamp.

5. The apparatus of claim 1, wherein said pulse generating circuit comprises only a single transistor and wherein said altering circuit is connected across said first filament of said second lamp.

6. The apparatus of claim 5, wherein said altering circuit comprises a diode connected to a winding at said low voltage input side of said transformer.

7. An improved fluorescent lighting apparatus for extending the on/off life of first and second fluorescent lamps which are connected in series, said first fluorescent lamp, having a first filament at one end and a second filament at another end, each of said filaments of said first lamp being connected across first and second contacts, and said second fluorescent lamp having a first filament at one end and a second filament at another end, each of said filaments of said second lamp being connected across first and second contacts, said lighting apparatus comprising:

a step-up voltage transformer having a low voltage input side and a high voltage output side, wherein a high voltage output is provided across first and second taps at said high voltage output side of said transformer, said transformer further including first and second filament warming coils on said high voltage output side, said contacts of said second filament of said first lamp being connected to said first filament warming coil and said second filament of said second lamp being connected to said second filament warming coil on said high voltage output side of said step-up voltage transformer;

said first and second fluorescent lamps being connected in series across said first and second taps at said high voltage output side of said transformer;

a single-transistor, DC pulse generation circuit for periodically varying voltage at said low voltage input side of said transformer to induce a periodically varying voltage at said high voltage output side of said transformer, thereby supplying a high voltage waveform across said series connected fluorescent lamps, said single transistor within said DC pulse generation circuit having a base, an emitter, and a collector, and being connected in an emitter follower configuration, said base of said transistor being connected to said first contact of said first filament of said first lamp and said collector of said transistor being connected to said second contact of said first filament of said second lamp via a biasing resistor, said second contact of said first filament of said first lamp being connected to said first contact of said first filament of said second lamp to provide a pair of connected filaments so that said DC pulse generation circuit supplies a periodically varying voltage across said pair of connected filaments, said pulse generation circuit further including a first voltage regulation diode connected between said emitter and said base of said transistor, a second voltage regulation diode connected between said emitter and said base of said transistor, and a switching diode connected from said base of said transistor to said second contact of said first filament of said second lamp, said DC pulse generation circuit further including an oscillation capacitor connected between said low voltage input side of said transformer and said second contact of said first filament of said second lamp; and a current altering circuit comprising a coil winding connected at said low voltage input side of said transformer, and a diode connected in series within said coil winding, said diode and coil winding being connected across said first filament of said second lamp; whereby the circuit equalizes the voltages across the first and second lamps immediately prior to ignition of first and second lamps.

* * * * *

UNITED STATES PATENT AND TRADEMARK OFFICE
CERTIFICATE OF CORRECTION

PATENT NO. : 5,568,018
DATED : October 22, 1996
INVENTOR(S) : Fred A. Muzic

It is certified that error appears in the above-indentified patent and that said Letters Patent is hereby corrected as shown below:

Claim 4: Column 9, line 61, change "of the first lamp" to --of the second lamp--

Claim 7: Column 10, line 64, change "ignition of first" to --ignition of said first--

Signed and Sealed this

Twentieth Day of May, 1997

Attest:

BRUCE LEHMAN

Attesting Officer       Commissioner of Patents and Trademarks

REEXAMINATION CERTIFICATE (3468th)

United States Patent [19]

Muzic

[11] B1 5,568,018

[45] Certificate Issued  Mar. 17, 1998

[54] FLUORESCENT LIGHT BALLAST CIRCUIT

[76] Inventor: Fred A. Muzic, 16411 Underhill La., Huntington Beach, Calif. 92647

Reexamination Request:
No. 90/004,613, Apr. 25, 1997

Reexamination Certificate for:
Patent No.: 5,568,018
Issued: Oct. 22, 1996
Appl. No.: 407,393
Filed: Mar. 17, 1995

Certificate of Correction issued May 20, 1997.

Related U.S. Application Data

[63] Continuation of Ser. No. 115,476, Sep. 1, 1993, abandoned.

[51] Int. Cl.$^6$ .................................................. H05B 41/16
[52] U.S. Cl. .................... 315/276; 315/101; 315/200 R; 315/352; 315/272; 315/203; 315/206; 315/DIG. 5

[56] References Cited

U.S. PATENT DOCUMENTS

| 2,241,261 | 5/1941 | Horn | 315/201 |
| 4,757,238 | 7/1988 | Rhee | 315/240 |

*Primary Examiner*—Robert Pascal

[57] ABSTRACT

An improved fluorescent light ballast circuit extends the on/off life of a fluorescent lamp within a lighting circuit having a pair of series connected fluorescent lamps. The ballast circuit includes a DC pulse generation circuit, filtering and voltage regulation circuitry, a step-up voltage transformer, and a current altering circuit which alters the current within selected filaments within the lamps. The current altering circuit includes a diode and a coil winding which connect across a filament within one of the fluorescent lamps. The net effect of the current altering circuit is to increase the voltage supplied across the lamp connected to the current altering circuit so that the voltage levels across both lams are balanced.

B1 5,568,018

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–7 is confirmed.

* * * * *